(12) United States Patent
Hosoya et al.

(10) Patent No.: US 12,302,937 B2
(45) Date of Patent: May 20, 2025

(54) SOLID OBJECTS FEEDER AND APPARATUS FOR MANUFACTURING FOOD PRODUCT WITH SOLID OBJECTS FEEDER

(71) Applicant: RHEON AUTOMATIC MACHINERY CO., LTD., Tochigi (JP)

(72) Inventors: Masaki Hosoya, Tochigi (JP); Hirofumi Okubo, Tochigi (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 174 days.

(21) Appl. No.: 18/026,470

(22) PCT Filed: Sep. 17, 2021

(86) PCT No.: PCT/JP2021/034335
§ 371 (c)(1),
(2) Date: Mar. 15, 2023

(87) PCT Pub. No.: WO2022/059781
PCT Pub. Date: Mar. 24, 2022

(65) Prior Publication Data
US 2023/0270153 A1    Aug. 31, 2023

(30) Foreign Application Priority Data

Sep. 18, 2020   (JP) ................................. 2020-157851

(51) Int. Cl.
*A23P 20/25*   (2016.01)
*A21C 11/16*   (2006.01)
(Continued)

(52) U.S. Cl.
CPC .................................. *A23P 20/25* (2016.08)

(58) Field of Classification Search
CPC .......... A23P 20/25; A23P 20/20; A21C 9/063; A21C 9/061; A21C 9/066; A21C 11/163; B65G 47/08; B65G 47/1428; B65D 83/00
See application file for complete search history.

(56) References Cited

U.S. PATENT DOCUMENTS

| 3,245,589 A * | 4/1966 | Temliak ............. B65D 83/0409 |
|---|---|---|
| | | 222/362 |
| 2019/0276244 A1* | 9/2019 | Hoshi ................ B65G 65/4809 |

FOREIGN PATENT DOCUMENTS

| JP | 57-184813 U | 11/1982 |
|---|---|---|
| JP | 2010148493 A | 7/2010 |
| JP | 2019034854 A | 3/2019 |

OTHER PUBLICATIONS

English translation of WO 2019/031558 A1 (Year: 2019).*
Written Opinion, PCT/JP2021/034325, Nov. 30, 2021.

* cited by examiner

*Primary Examiner* — Galen H Hauth
*Assistant Examiner* — Baileigh Kate Darnell
(74) *Attorney, Agent, or Firm* — Dilworth & Barrese, LLP (57) ABSTRACT

A solid object feeder according to the present invention includes a rotary disk including a plurality of storing holes of storing solid objects, a supporting member disposed below the rotary disk, and a guide member disposed above a peripheral portion of the rotary disk. The supporting member includes a step region continuing from an upstream side to a downstream side with respect to the guide member, and another region located upstream of the step region. A gap between the supporting member and a lower surface of the rotary disk in the step region is defined so that the solid object can move a space below the guide member from the upstream side to the downstream side. The gap is larger than (Continued)

a gap between the supporting member and the lower surface of the rotary disk in the other region.

8 Claims, 8 Drawing Sheets

(51) Int. Cl.
*A23P 20/20* (2016.01)
*B65D 47/08* (2006.01)

SOLID OBJECTS FEEDER AND APPARATUS FOR MANUFACTURING FOOD PRODUCT WITH SOLID OBJECTS FEEDER

TECHNICAL FIELD

The present invention relates to a solid object feeder and a manufacturing device for a food product containing a solid object with the solid object feeder. Specifically, the present invention relates to a solid object feeder that can supply a solid object without damaging it, and a manufacturing device for a food product containing the solid object with the solid object feeder.

BACKGROUND ART

An encrusted food product containing a solid object is, for example, a manju containing a syrup-soaked whole chestnut, and a mooncake with a yolk (salt water-soaked duck egg). Such a mooncake with a yolk is a sweet stuff in which a bean paste such as lotus seed paste or red bean paste is encrusted by an outer skin material and one or two yolks are contained in the bean paste. A device of manufacturing such an encrusted food product containing a solid object is, for example, a manufacturing device for an encrusted food product with a solid object feeder. This manufacturing device is, for example, a device referred to as an encrusting machine.

An encrusting machine described in Patent Publication 1 includes a combining nozzle in which an outer cylinder, an inner cylinder and a central cylinder are concentrically arranged, a solid object feeder disposed on an upper portion of the combining nozzle, an encrusting and cutting device disposed below the combining nozzle, and a belt conveyor, namely, a conveying device disposed below the encrusting and cutting device.

This solid object feeder includes a rotary disk and a drive mechanism for rotating the rotary disk. The rotary disk includes a plurality of storing holes of storing solid objects, which storing holes are equally spaced on a circumference of a circle in a peripheral portion of the rotary disk, and is configured to supply the solid object stored in the storing hole at a supplying location downwardly from the rotary disk. The solid object feeder further includes a central projecting part which projects upwardly at a central portion of the rotary disk, an outer wall extending upwardly from the peripheral portion of the rotary disk and outside of the rotary disk, and a guide member which partitions an inside of the outer wall into a storage portion for storing solid objects and a supply portion including the supplying location.

One solid object is intermittently supplied from the solid object feeder to the central cylinder of the combining nozzle. A rod-like triple-structure food product, which consists of the solid object, an inner material surrounding the solid object, and an outer skin material surrounding the inner material, is discharged from the combining nozzle. Further, the rod-like food product is cut by the encrusting and cutting device into an encrusted food product containing the one solid object.

A device for moving a particle described in the Patent Publication 2 includes a rotary disk, which is tilted relative to the horizontal direction and includes a plurality of storing holes equally spaced on a circumference of a circle, an outer wall disposed along a periphery of the rotary disk, and a driving device for rotating the rotary disk.

In this device, a leaf spring is attached to the outer wall to almost contact an upper surface of the rotary disk. The leaf spring is disposed at a level higher than the lowest level in the tilted rotary disk and is configured to downwardly flick particles of, for example, grain, overflowed out of the storing hole.

In the solid object feeder described in the Patent Publication 1, the guide member prevents the plurality of solid objects, which are loaded into the storage portion but still present on the rotary disk (i.e., are not stored in the storing holes), to be moved to the supplying portion. However, when the rotary disk is rotated while the solid object protrudes from the storing hole, the solid object may be sandwiched between the guide member and an upper edge of the storing hole so that the solid object is broken. Specifically, such a case is likely caused when the solid object is relatively viscous and relatively soft, as a syrup-soaked whole chestnut and a yolk.

In the device for moving particles described in the Patent Publication 2, the particles which are not stored in the storing holes are prevented from being moved upwardly by tilting the rotary disk as the rotary disk rotates. Further, the leaf spring prevents a second particle from entering the storing hole. However, the solid object which is relatively viscous may be moved upwardly as the rotary disk rotates, and the solid object protruding from the storing hole may be sandwiched between the leaf spring and the storing hole to be broken (damaged).

The broken solid object has been separated into a small piece and a deficient solid object caused after the small piece has been scraped off. The small piece is moved to the supplying location with another whole solid object stored in the same storing hole as the small piece, and after that, the small piece is encrusted inside of an encrusted food product by the food manufacturing device. Further, the deficient solid object is stored in the storing hole and finally encrusted inside of another encrusted food product. These encrusted food products are defective products containing irregular solid objects. Thus, a solid object feeder which can supply solid objects without damaging them is desired.

PRIOR ART PUBLICATION

Patent Publication 1: Japanese Patent Laid-open Publication No. 2019-034854

Patent Publication 2: Japanese Utility Model Laid-open Publication No. S57-184813

Patent Publication 3: Japanese Patent Laid-open Publication No. 2010-148493

SUMMARY OF THE INVENTION

Problem to be Solved by the Invention

An object of the present invention is to provide a solid object feeder which can stably supply solid objects without damaging them and a manufacturing device for a food product with the solid object feeder.

Means for Solving the Problem

The present invention has been made in view of the above-stated problem and is directed to a solid object feeder which includes a rotary disk including a plurality of storing holes of storing solid objects equally spaced on a circumference of a circle in a peripheral portion of the rotary disk; a driving device for rotating the rotary disk; and a supplying location at which the solid object stored in the storing hole is supplied downwardly from the rotary disk, and further includes a guide member disposed above the peripheral portion of the rotary disk, and a supporting member which is disposed below the rotary disk for supporting the solid object stored in the storing hole and defines an opening through which the solid object moves downwardly at the supplying location, wherein the supporting member includes a step region in a support area of supporting the solid objects, the step region continues from an upstream side to a downstream side relative to the guide member in a rotational direction, and a gap between a lower surface of the rotary disk and the step region is larger than the other region of the support area.

For example, the step region is formed in the support area of the supporting member to continue from an upstream side relative to the guide member in the rotational direction to a location in which the storing hole passes at least a space below the guide member on a downstream side of the guide member.

For example, the step region is formed in the support area of the supporting member to continue from a lowering start location, which corresponds to a first storing hole counted from the guide member toward an upstream side in the rotational direction, to the opening on a downstream side of the guide member.

For example, the rotary disk is tilted so that the supplying location is higher than the lowering start location of the solid object, namely, the beginning point of the step region.

For example, the rotary disk includes a central projecting part which is formed with a slope peripheral surface on an upper surface of the rotary disk, and the slope peripheral surface slopes downwardly from a center of the rotary disk toward its periphery.

For example, the central projecting part is disposed inside of an annular area in which the storing holes are disposed.

For example, an outer wall is provided to extend upwardly higher than the peripheral portion at an outside of the rotary disk, and the guide member is disposed between an inner side of the outer wall and the central projecting part to partition a storage portion of storing the solid objects from a supply portion including the supplying location.

For example, an outer wall is provided to extend upwardly higher than the peripheral portion at the periphery of the rotary disk, and the guide member is disposed between an inner side of the outer wall and the central projecting part to partition a storage portion of storing the solid objects from a supply portion including the supplying location.

The present invention also includes a manufacturing device for a food product with the above-stated solid object feeder.

Effects of the Invention

In the solid object feeder according to the present invention, since the supporting member of supporting the solid object includes the step region in the support area below the guide member, and the step region is formed so that the gap between the lower surface of the rotary disk and the step region is larger than the other region of the support area, another solid object rather than that to be stored in the storing hole is prevented from entering the storing hole. Thus, when the solid object is moved from the storage portion to the supply portion, the other solid object is not or is prevented from being sandwiched between the guide member and the storing hole to be broken (damaged), and the solid object can be surely stored in the storing hole, so that the predetermined solid object can be surely supplied from the supplying location of the solid object feeder.

Further, since a number of solid objects can be loaded into the storage portion at one time, the work efficiency can be enhanced.

DESCRIPTION OF EMBODIMENTS

Figure 1:
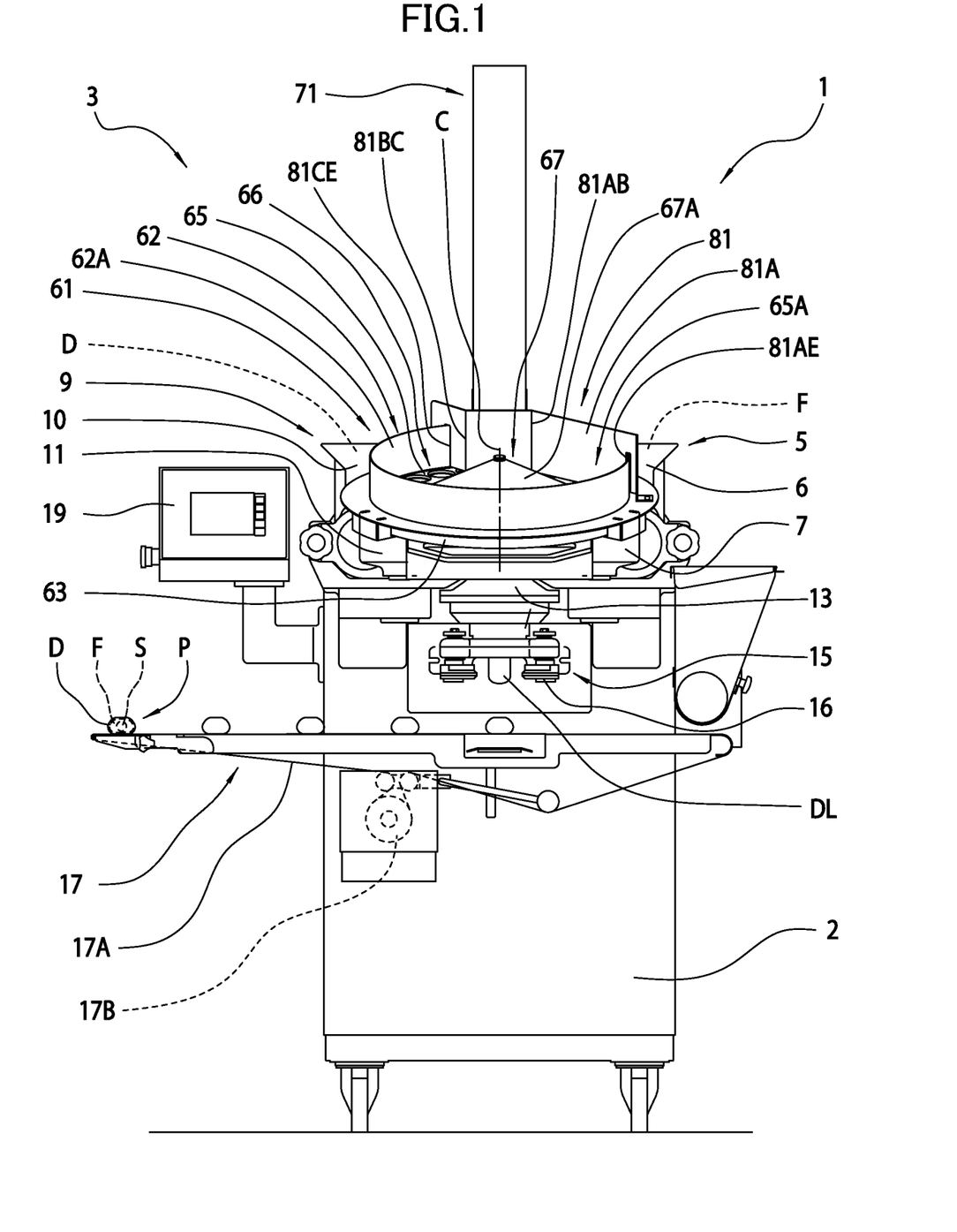
FIG. 1 is a schematically front view of a manufacturing device 1 for an encrusted food product with a solid object feeder 3 according to a first embodiment of the present invention.

Referring to FIGS. 1-5, a manufacturing device 1 for an encrusted food product, which device includes a solid object feeder 3 according to a first embodiment of the present invention, will be explained. As shown in FIG. 1, the manufacturing device 1 for the encrusted food product may be a so-called encrusting machine, and further includes a base frame 2, an inner material supplying device 5 and an outer skin material supplying device 9 which are disposed on an upper part of the base frame 2, a combining nozzle 13, an encrusting and cutting device 15, and a conveying device 17 which are disposed on a front side (near side in FIG. 1) of the base frame 2, and a control device 19 for controlling a driving action of each device.

The inner material supplying device 5 is configured to supply an inner material F, which is a food material, to the combining nozzle 13, and includes a hopper 6, a screw (not shown) rotatably disposed at a bottom of the hopper 6, and a pump 7 disposed at a tip side of the screw. The outer skin material supplying device 9 is configured to supply an outer skin material D, which is a food material, to the combining nozzle 13, and includes a hopper 10, a screw (not shown) rotatably disposed at a bottom of the hopper 10, and a pump 11 disposed on a tip side of the screw.

The combining nozzle 13 is disposed between the inner material supplying device 5 and the outer skin material supplying device 9. The combining nozzle 13 includes a center cylinder 23, and is configured to discharge a rod-like dough DL with a triple structure by surrounding an outside of a solid object S, which is supplied from the solid object feeder 3 to the center cylinder 23, with the inner material F, and then combining the outer skin material D to an outside of the inner material F. The combining nozzle 13 may be one with a known structure, and its detailed explanation is omitted.

The encrusting and cutting device 15 is a shutter device including a plurality of shutter pieces 16, and can be raised and lowered below the combining nozzle 13. The encrusting and cutting device 15 is configured to cut and encrust the rod-like dough DL to form an encrusted food product P which contains the solid object S.

The conveying device 17 is a belt conveyor, and is disposed below the encrusting and cutting device 15. The conveying device 17 includes an endless flat belt. The flat belt is a conveyor belt 17A of conveying the encrusted food product P, is wound around a driving pulley 17B and so on, and is configured to be intermittently operated.

Figure 2A:
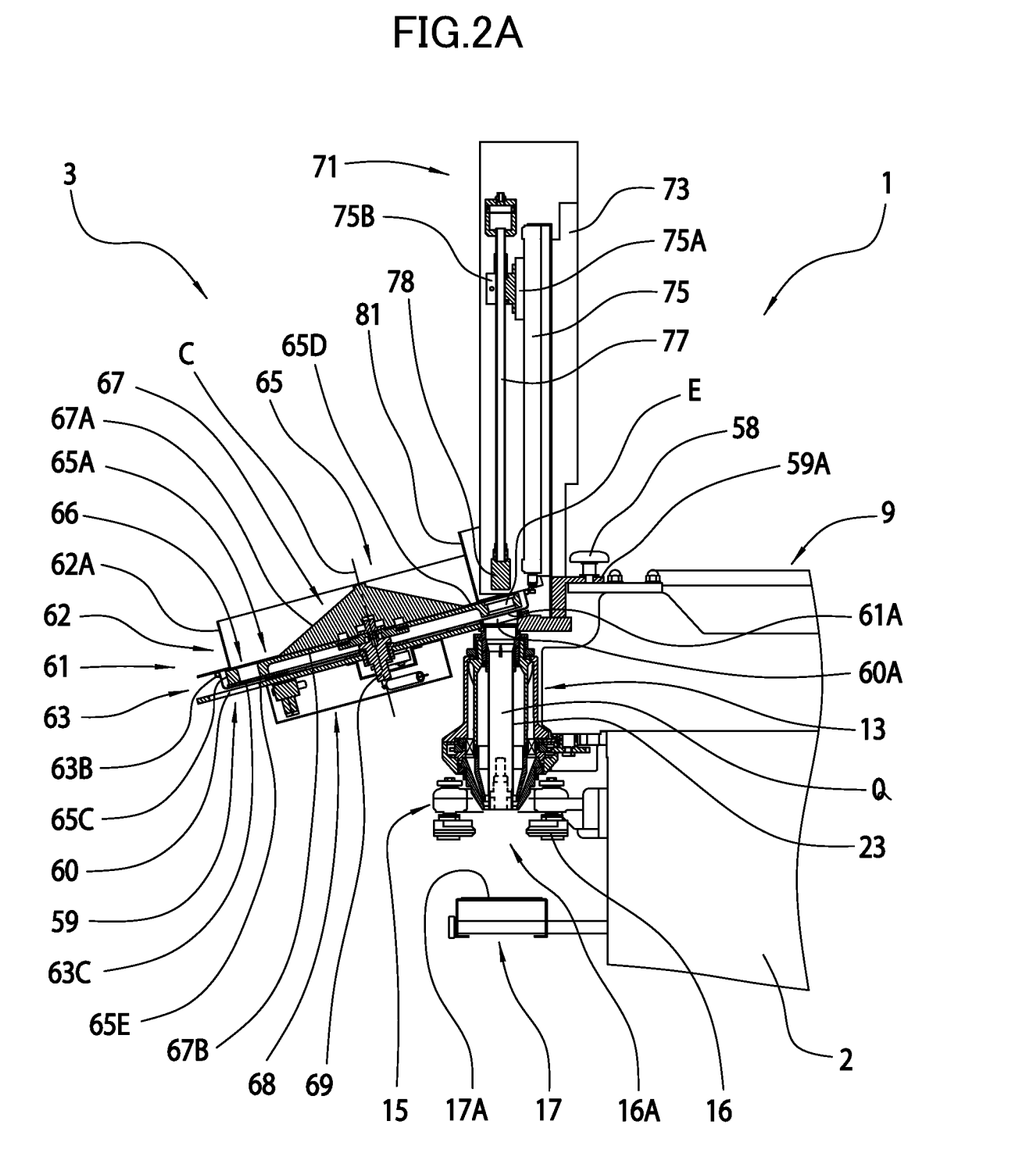
FIG. 2A is a partially cross-sectional and schematically side view of the manufacturing device 1 for the encrusted food product with the solid object feeder 3 according to the first embodiment of the present invention.

The solid object feeder 3, which is the first embodiment of the present invention, is detachably attached (disposed) on an upper part of the combining nozzle 13. Specifically, as shown in FIG. 2A, the solid object feeder 3 includes a base 59. The base 59 includes a base end portion 59A (right side in FIG. 2A) and a base plate 60. The solid object feeder 3 is detachably secured to the base frame 2 of the manufacturing device 1 by securing the base end portion 59A of the base 59 (right side in FIG. 2A) with setscrew 58. The base plate 60 of the base 59 is disposed to tilt downwardly from the base frame 2 of the manufacturing device 1 toward a near side (a near side of a FIG. 1 paper, or from right side to left side in FIG. 2A). A tilt angle of the base plate 60 is, for example, 15 degrees relative to the horizontal direction. The base plate 60 includes an opening 60A which is concentric with the center cylinder 23 of the combining nozzle 13.

Figure 2B:
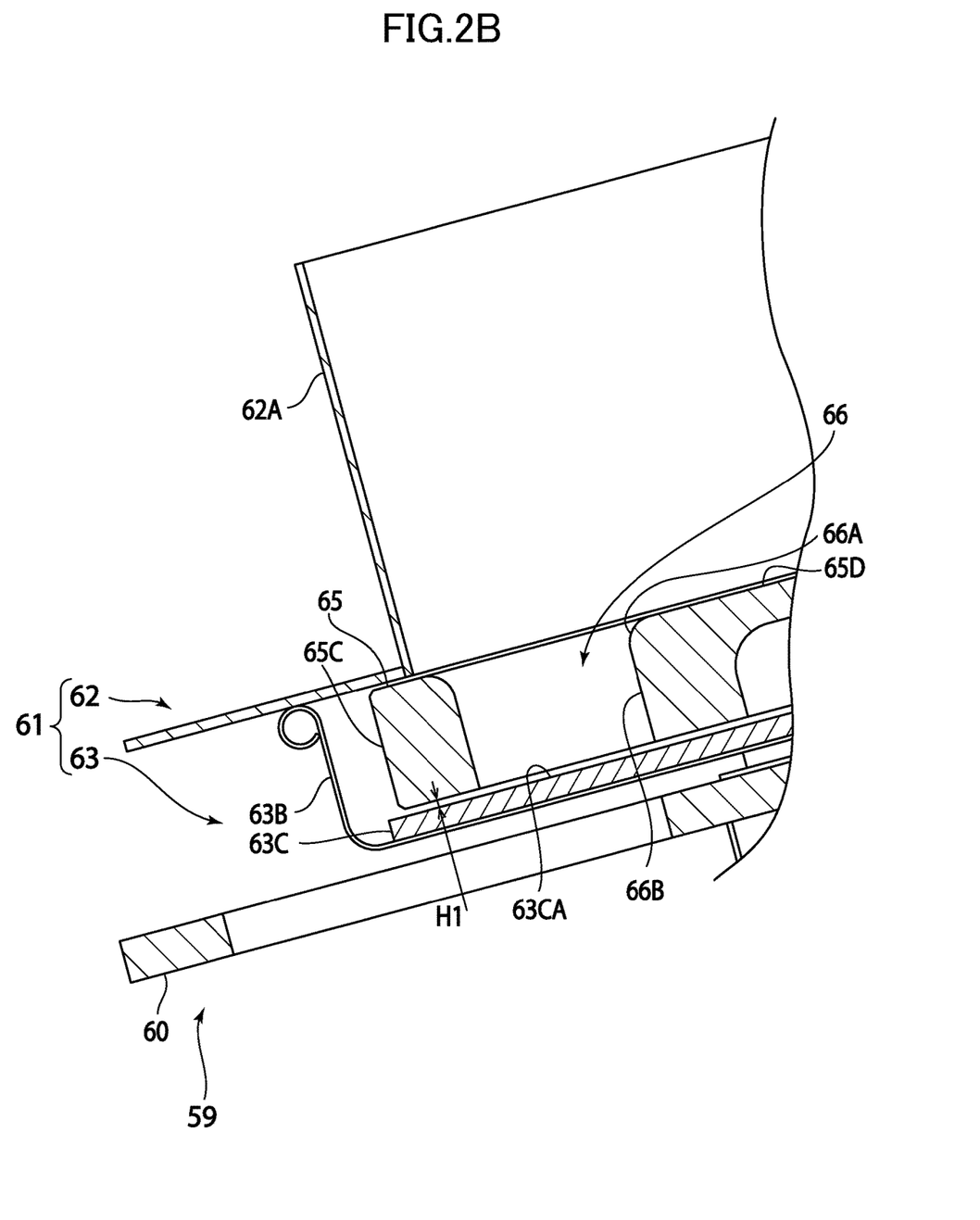
FIG. 2B is a partially enlarged view of FIG. 2A.

The solid object feeder 3 further includes a hopper 61. As shown in FIGS. 2A and 2B, the hopper 61 is defined by an upper hopper 62 on an upper side and a lower hopper 63 on a lower side. The hopper 61 (concretely, the lower hopper 63) is detachably secured to an upper surface of the base plate 60 by screws via an appropriate member. A bottom surface 63BB of the hopper 61 (concretely, an upper surface of a bottom wall of the lower hopper 63) has an opening 61A, which is concentric with the opening 60A of the base plate 60, at a position above the combining nozzle 13. The upper hopper 62 is detachably secured to the lower hopper 63.

Figure 3:
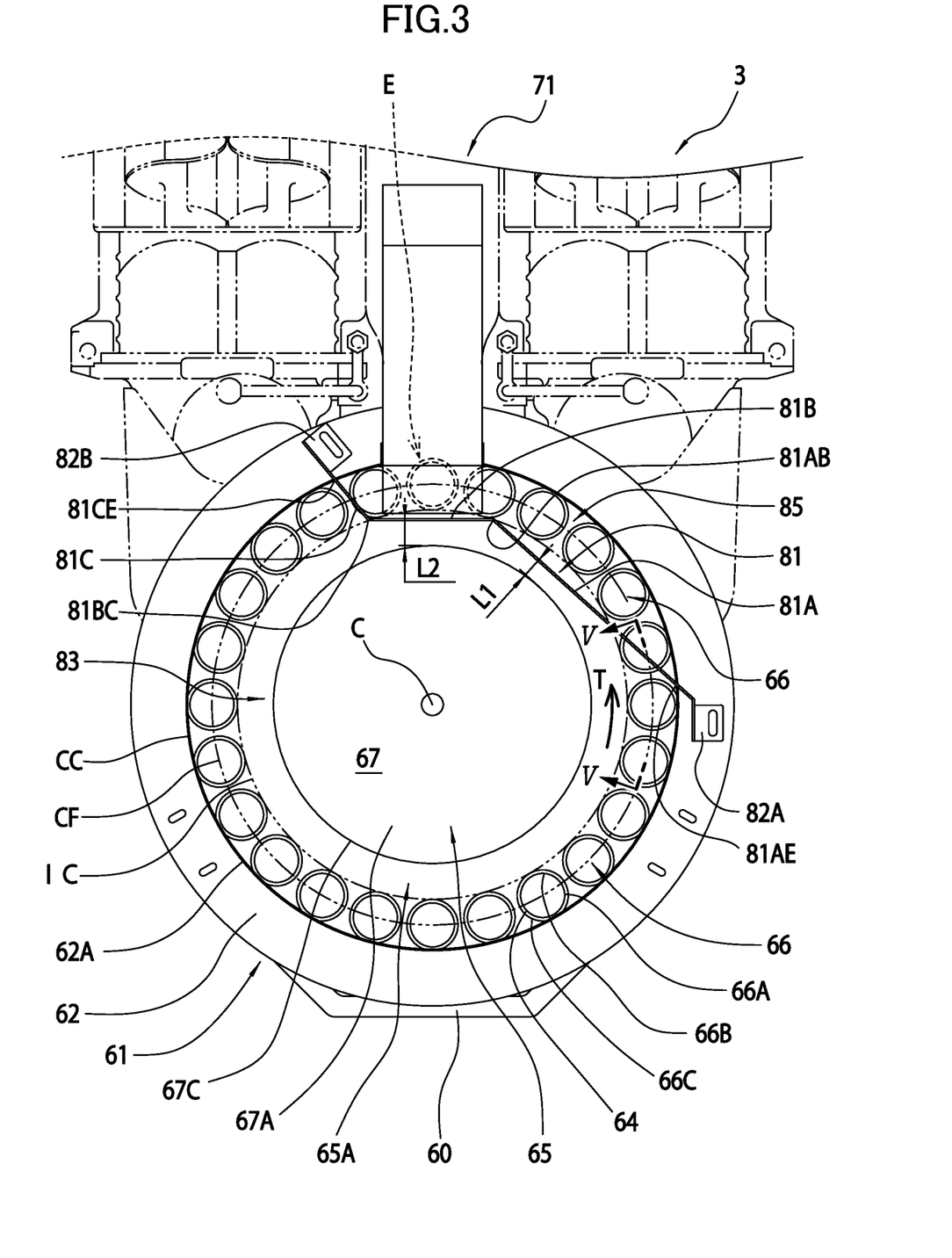
FIG. 3 is a schematic view of a rotary disk 65 of the solid object feeder 3 according to the first embodiment of the present invention, viewed in a direction normal to the rotary disk 65.

The solid object feeder 3 further includes a rotary disk 65 which is rotationally driven around a central axis C. As shown in FIG. 2B, the rotary disk 65 is disposed inside of the hopper 61. The rotary disk 65 is parallel to the base plate 60, namely, disposed to tilt downwardly relative to the horizontal direction from the base frame 2 toward the near side. As shown in FIG. 3, the rotary disk 65 includes a plurality of (twenty-four in this embodiment) storing holes 66 equally spaced on a circumference CF of a circle. In the present embodiment, the rotary disk 65 includes attachment holes (not shown) at positions corresponding to the storing holes 66, and the storing holes 66 are formed by detachably and interchangeably attaching tubular attachment members 64 into the attachment holes (not shown). The storing hole 66 is defined by a flared-shape introduction portion 66A which is formed with a curved surface downwardly from the upper surface 65D of the rotary disk 65, and a cylindrical portion 66B which continuously extends from a lower end of the introduction portion 66A toward a lower surface 65E of the rotary disk 65 and has a cylindrical shape (see FIG. 2B). Hereafter, a circumference of a circle of the introduction portion 66A located at the upper surface of the rotary disk 65 is referred to as the "maximum periphery 66C of the storing hole 66." Further, a circumference of a circle circumscribing the maximum peripheries 66C of the twenty-four storing holes 66 is referred to as a "circumscribed circle CC of the storing holes 66," and a circumference of a circle inscribing the maximum peripheries 66C of the twenty-four storing holes 66 is referred to as an "inscribed circle IC of the storing holes 66." Further, an area surrounded by the circumscribed circle CC of the storing holes 66 and the inscribed circle IC of the storing holes 66 is referred to as an "annular area in which the storing holes are disposed." Further, a location of the storing hole 66 when the storing hole 66 is located above the center cylinder 23 of the combining nozzle 13 is referred to as a "supplying location E (of the solid object S)."

As shown in FIGS. 2A and 3, the solid object feeder 3 further includes a cone-shaped central projecting part 67 which is detachably and interchangeably attached to the rotary disk 65 at a central portion of the upper surface 65D of the rotary disk 65. The central projecting part 67 is disposed inside of the inscribed circle IC of the storing holes 66 and includes a side surface 67A which slopes toward the central axis C of the rotary disk 65 as it goes from its lower side to its upper side, and a bottom surface 67B which abuts onto the upper surface 65D of the rotary disk 65. Hereafter, a periphery of the bottom surface 67B is referred to as the "maximum periphery 67C of the central projecting part 67." Further, a portion of the rotary disk 65 outside of the central projecting part 67 is referred to as a "peripheral portion 65A of the rotary disk 65." Although the rotary disk 65 and the central projecting part 67 are explained as separate members, they may be integrally formed.

The solid object feeder 3 further includes a driving device 68 which is disposed on a lower surface of the base plate 60, and is configured to intermittently drive and rotate the rotary disk 65 in a rotational direction shown by an arrow T (by 15 degrees in this embodiment). The driving device 68 may be defined by a known mechanism, and for example, includes an electric motor such as a servomotor and a ratchet mechanism. Further, the rotary disk 65 is detachably secured to a rotating shaft 69 of the driving device 68. The rotating shaft 69 is disposed perpendicular to the base plate 60.

Further, as shown in FIG. 2A, the solid object feeder 3 further includes a pushing device 71 disposed above the rotary disk 65 and the combining nozzle 13. The pushing device 71 is a device for pushing the solid object S, which is supplied into the combining nozzle 13, to a lower position of the combining nozzle 13. The pushing device 71 includes a stand 73, which is attached to the base 59 between the hopper 61 and the setscrew 58, and a longitudinal direction of the stand 73 is along the vertical direction. The pushing device 71 further includes a rodless cylinder 75 which is a linear actuator, a rod 77, and a piston 78. The rodless cylinder 75 is fixed to one side of the stand 73. The rodless cylinder 75 includes a slider 75A and a holder 75B, and the rod 77 is attached to the slider 75A via the holder 75B. The rod 77 is disposed so that its longitudinal direction is along the vertical direction. The piston 78 is threadably secured to a lower end of the rod 77. The piston 78 is configured to pass through the storing hole 66 of the rotary disk 65 when its rotation is stopped and to be raised and lowered inside of the center cylinder 23 of the combining nozzle 13.

As shown in FIG. 2B, the upper hopper 62 includes an approximately annular outer wall 62A disposed above the rotary disk 65. The approximately annular outer wall 62A is located inside of the periphery 65C of the rotary disk 65 and outside of the circumscribed circle CC of the storing holes 66, and extends upwardly (stands) from a position slightly above the upper surface 65D of the rotary disk 65. Further, the outer wall 62A of the upper hopper 62 extends perpendicular to the base plate 60 and the upper surface 65D of the rotary disk 65.

The solid object feeder 3 further includes a guide member 81. As shown in FIG. 3, the guide member 81 is a plate-like member, is bent at a plurality of locations when the rotary disk 65 is viewed from a side of the upper surface 65D, and is detachably secured to the upper hopper 62 at securing portions 82A, 82B namely, opposite ends of the guide member 81. The guide member 81 includes a first guide portion 81A, a second guide portion 81B, and a third guide portion 81C, and these guide portions 81A, 81B, 81C are disposed above the peripheral portion 65A of the rotary disk 65 inside of the outer wall 62A of the upper hopper 62. There is a slight gap between the guide member 81 (guide portions 81A, 81B, 81C) and the upper surface 65D of the rotary disk 65 (see FIG. 5).

The first guide portion 81A includes one end (beginning point) 81AE located inside of the outer wall 62A of the upper hopper 62, and the other end 81AB located between the maximum periphery 67C of the central projecting part 67 and the inscribed circle IC of the storing holes 66. The shortest distance L1 between the first guide portion 81A and the maximum periphery 67C of the central projecting part 67 is preferably shorter than an outer diameter of the solid object S and is more preferably longer than a radius (half of the outer diameter) of the solid object S. Hereafter, the one end 81AE of the first guide portion 81A is referred to as a "beginning point of the guide member 81", and the other end 81AB of the first guide portion 81A is referred to as a "first bent edge of the guide member 81."

The second guide portion 81B is located between the maximum outer periphery 67C of the central projecting part 67 and the inscribed circle IC of the storing holes 66 near the supplying location E of the solid object S. The second guide portion 81B includes one end that is the other end 81AB of the first guide portion 81 (the first bent edge of the guide member 81), and the other end 81BC. The shortest distance L2 between the second guide portion 81B and the maximum periphery 67C of the central projecting part 67 is preferably longer than the radius (half of the outer diameter) of the solid object S. The other end 81BC of the second guide portion 81B defines a second bent edge of the guide member 81.

The third guide portion 81C includes one end that is the other end 81BC of the second guide portion 81B (the second bent edge of the guide member 81), and the other end (end point) 81OE that is located inside of the outer wall 62A of the upper hopper 62. The third guide portion 81C is preferably located between the storing holes 66 adjacent to each other when the rotation of the rotary disk 65 is stopped. The other end 81OE of the third guide portion 81C is referred to as an "end point of the guide member 81."

In the guide member 81, the one end 81AE of the first guide portion 81A (the beginning point of the guide member 81) is disposed to contact an inner periphery of the outer wall 62A, while an approximate center of the first guide portion 81A and an approximate center of the second guide portion 81B are disposed close to the maximum periphery 67C of the central projecting part 67, and the other end 81OE of the third guide portion (end point of the guide member 81) is disposed to contact the inner periphery of the outer wall 62A. This allows a space surrounded (formed) by the rotary disk 65 and the outer wall 62A of the upper hopper 62 to be partitioned (divided) into a storage portion 83 and a supply portion 85. The storage portion 83 is a space into which a number of solid objects S are loaded at one time to be temporarily stored. The supply portion 85 includes the supplying location E of the solid object S.

Figure 4:
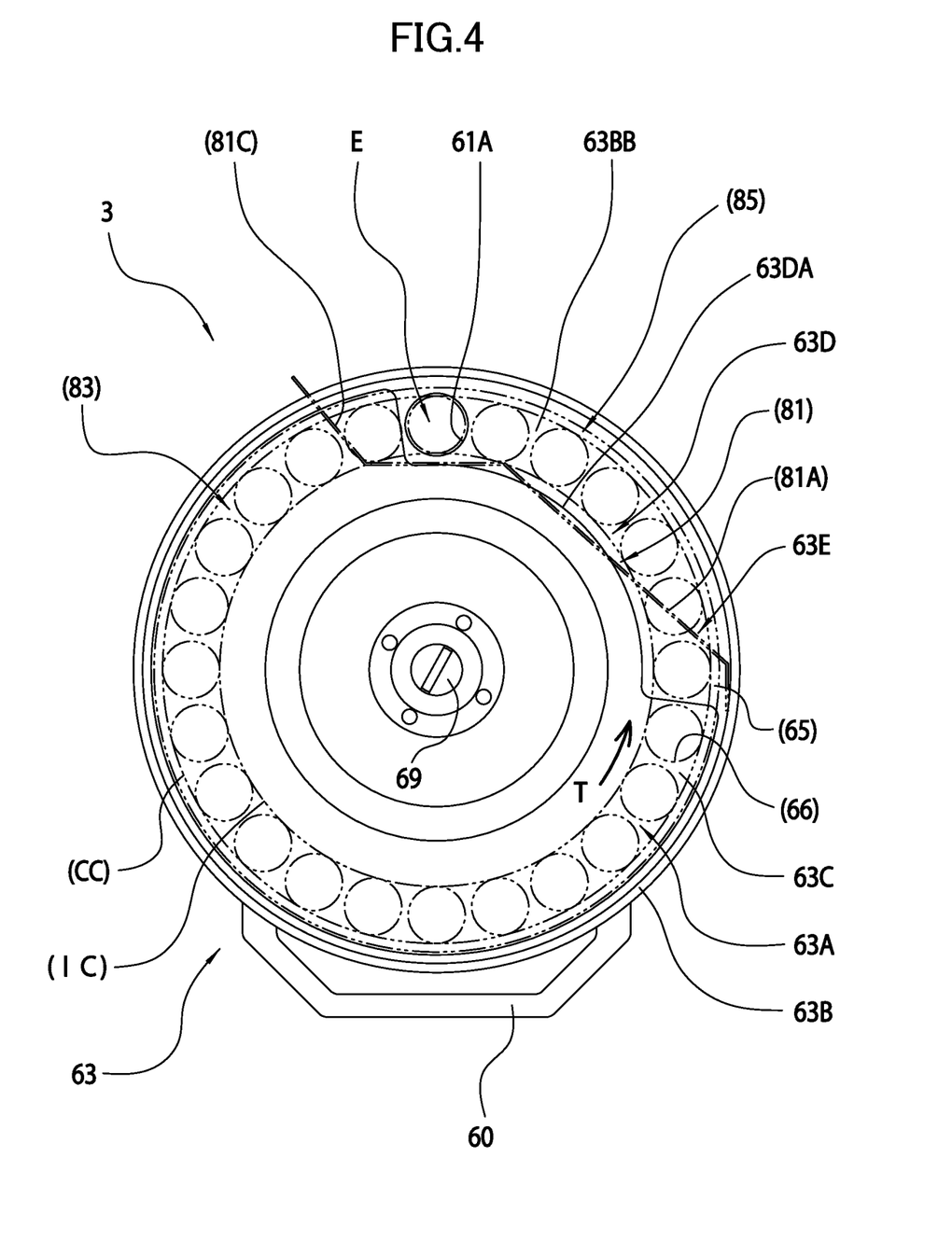
FIG. 4 is a schematic view of a supporting member of the solid object feeder 3 according to the first embodiment of the present invention.
Figure 5:
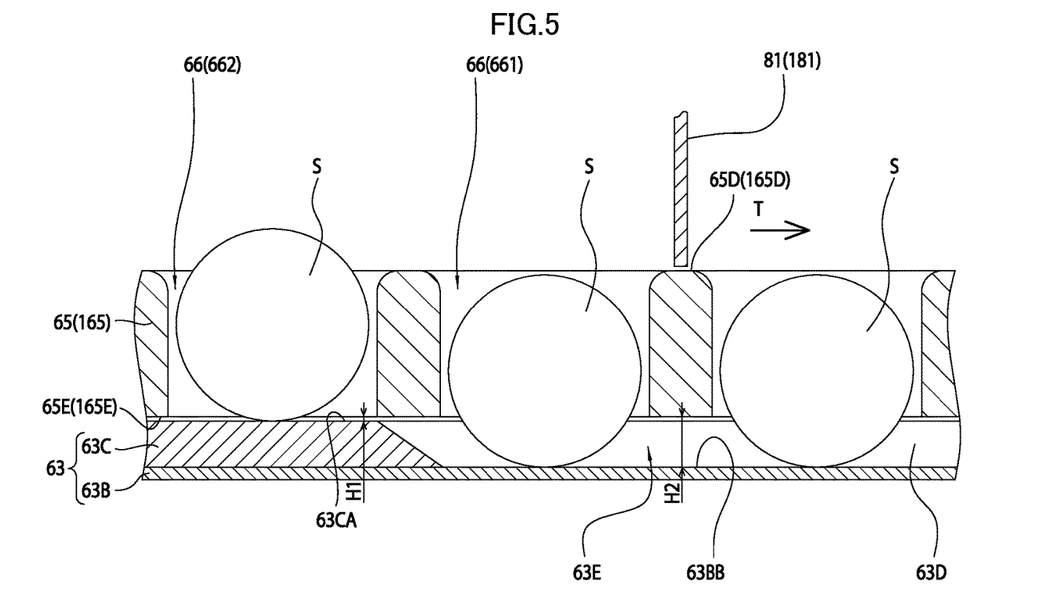
FIG. 5 is a cross-sectional view along the line V-V in FIG. 3 schematically showing movement of a solid object S in the solid object feeder 3 according to the first embodiment of the present invention.

Referring to FIGS. 2B, 4 and 5, a configuration of the lower hopper 63 will be explained in detail. As shown in FIGS. 2B and 5, the lower hopper 63 includes a tub-shaped lower hopper body 63B (with a bottom wall and a sidewall), and a spacer 63C which is located on and integrally formed with the bottom wall of the lower hopper body 63B. The spacer 63C is almost a disk with the same diameter as that of the rotary disk 65, includes a flat top surface 63CA, and is disposed so that there is a slight gap H1 between the top surface 63CA and the lower surface 65E of the rotary disk 65. Further, as shown in FIG. 4, the spacer 63C includes an approximately C-shaped circumferential cutout 63D. Preferably, a diameter of a circumferential surface 63DA of the cutout 63D is slightly smaller than, for example, the inscribed circle IC of the storing holes 66.

When viewed in the rotational direction T of the rotary disk 65, the beginning point of the cutout 63D is located upstream of the first guide portion 81A and, specifically, just downstream of the first storing hole 66 (661) counted from the first guide portion 81A toward the upstream side (in this embodiment, a storing hole 66 located clockwise from the supplying location E by 90 degrees). The end point of the cutout 63D is located downstream of the first guide portion 81A, and specifically, just downstream of the storing hole 66 at the supplying location E. A thickness of the spacer 63C is, for example, 4 mm. Thus, a step region (step space) 63E is defined by the cutout 63D and the bottom surface 63BB of the lower hopper body 63B, namely, an upper surface of the bottom wall of the lower hopper body 63B. A gap H2 between the bottom surface 63BB and the lower surface 65E of the rotary disk 65 is larger than the gap H1 between the top surface 63CA of the spacer 63C and the lower surface 65E of the rotary disk 65 (see FIG. 5).

Further, by intermittently rotating this rotary disk 65 by 15 degrees due to rotation of the rotating shaft 69 in one direction (in the direction of the arrow T, or in a left rotational direction (i.e., counterclockwise) in FIG. 3), the solid object S stored in the storing hole 66 can be moved to the supplying location E so that the solid object S can be intermittently supplied into the combining nozzle 13. In this embodiment, the supplying location E is set at a location at which the storing hole 66 stops at the highest.

Next, referring to FIGS. 1-5, processes of manufacturing an encrusted food product P will be explained, in which processes the manufacturing device 1 for the encrusted food product including the solid object feeder 3 according to the first embodiment of the present invention is used. In the first embodiment, the encrusted food product P is a triple-structure mooncake, the outer skin material D is a confectionery dough for a mooncake, the inner material F is a lotus seed paste, and the solid object S is a yolk.

A number of solid objects S are loaded into the storage portion 83 of the hopper 61 (upper hopper 62) of the solid object feeder 3. By utilizing the tilt of the rotary disk 65 and the slope of the side surface 67A of the central projecting part 67, the loaded solid objects S are rolled laterally and downwardly to be stored in each of the storing holes 66 in the storage portion 83. The other solid objects S which are not stored in the storing holes 66 are held by the outer wall 62A of the hopper 61 (upper hopper 62) and accumulated to overlap each other on the upper surface 65D of the rotary disk 65. When the manufacturing device 1 is activated, the solid object feeder 3 is also activated by the control device 19.

In FIG. 5, when the rotary disk 65 is stopped, the first and second storing holes 66 counted from the guide portion 81 toward the upstream side in the rotational direction T are simply referred to as "the first storing hole 661" and "the second storing hole 662", respectively. As shown in FIG. 5, in the storage portion 83 of the hopper 61 (upper hopper 62), the solid objects S stored in the storing holes 66 except for the first storing hole 661 (for example, the second storing hole 662) are supported on the top surface 63CA of the spacer 63C. When the rotary disk 65 is rotated to allow the solid object S to reach the first storing hole 661, the solid object S is lowered into the step region 63E and is supported on the bottom surface 63BB of the lower hopper body 63B. This location of the storing hole 661 in which the solid object S is lowered is referred to as the "lowering start location." Further, when the solid object S is moved in the step region 63E by rotating the rotary disk 65 and reach the opening 61A of the hopper 61 (lower hopper 63), the solid object S is dropped into the combining nozzle 13. In this way, the hopper 61 (concretely, the top surface 63CA of the spacer 63C of the lower hopper 63 and the bottom surface 63BB of the lower hopper body 63B) functions as a supporting member to support the solid object S. Hereafter, an approximately annular area of the hopper 61 (lower hopper 63) on which the solid object S is supported is referred to as a "support area 63A" (see FIG. 4). The support area 63A coincides with, for example, an area between the inscribed circle IC of the storing holes 66 and the circumscribed circle CC of the storing holes 66 on the rotary disk 65.

Specifically, in the storage portion 83 as shown in FIG. 5, for example, the solid object S stored in the second storing hole 662 counted from the beginning point 81AE of the guide member 81 toward the upstream side is supported on the top surface 63CA of the spacer 63C which is the supporting member. At this time, a top or head of the solid object S protrudes from the upper surface 65D of the rotary disk 65. This protrusion prevents the other solid objects S from entering the second storing hole 662.

The rotary disk 65 is rotated in the rotating direction shown by the arrow T by 15 degrees and is temporarily stopped to move the solid object S stored in the second storing hole 662 to the location of the first storing hole 661 (lowering start location). This allows the solid object S to be lowered into the step region 63E of the support area 63A, that is, the solid object S is supported on the bottom surface 63BB of the hopper 61 (lower hopper 63) which is the supporting member, and the top or head of the solid object S is positioned below the upper surface 65D of the rotary disk 65. At this time, the other of the plurality of solid objects S located above the moved solid object S are restricted from moving to the location of the first storing hole 661 due to their interference with each other and viscosity effects of the surface of the yolk (solid object 5).

The rotary disk 65 is further rotated in the conveying direction T by 15 degrees and stopped again so that the storing hole 661 at the lowering start location is moved (rotated) toward the supply portion 85. At the same time, the solid object S which has been lowered upstream of the first guide portion 81A is moved to pass a space below the first guide portion 81A. At this time, since the other solid object S does not enter the first storing hole 661, the other solid object S is prevented from being sandwiched between the first guide portion 81A and the storing hole 66 and thus, is not or is prevented from being broken. In addition, the lower hopper 63 and the rotary disk 65 which are fixed to the base plate 60 are disposed to be tilted, and the supplying location E is located higher than the lowering start location 661 of the solid object S corresponding to the beginning point of the cutout 63D (step region 63E), so that the solid object S can be stably moved from the storage portion 83 to the supply portion 85.

The other of the plurality of solid objects S accumulated near the first guide portion 81A are accumulated on the upper surface 65D of the tilted rotary disk 65 and on the slope side surface 67A of the central projecting part 67 in a multi-overlapping way. The rotary disk 65 is rotated to move the other of the plurality of solid objects S from a side of the one end 81AE to a side of the other end 81AB due to lead of the first guide portion 81A. The other of the plurality of solid objects S are slid or rolled downwardly due to the tilt of the rotary disk 65 and the slope of the side surface 67A of the central projecting part 67, and are again held between the rotary disk 65 and the outer wall 62 at a lower level. Further, the solid object S is stored in an empty storing hole 66. In this way, the other of the plurality of solid objects S which are not stored in the storing holes 66 can be circulated in the storage portion 83. Thus, a number of solid objects S can be loaded into the storage portion 83 at one time to enhance work efficiency.

In the supply portion 85, when the storing hole 66 which stores one solid object S is stopped at the supplying location E due to the intermittent rotation of the rotary disk 65, the solid object S is no longer supported by the supporting member of the hopper 61. This causes the solid object S to be dropped into an inside of the center cylinder 23 of the combining nozzle 13 (into the passage Q) through the openings 61A, 60A. Further, the piston 78 of the pushing device 71 is lowered into the passage Q, so that the solid object S is pressed against the bag-like bottom of the rod-like dough DL pushed out through the combining nozzle 13 to closely attach a lower portion of the solid object S to the inner material F.

The piston 78 which has been lowered to the lower position is raised. The encrusting and cutting device 15 is operated to manufacture an encrusted food product P, in which the solid object S is contained, from a rod-like dough DL with a triple structure including the solid object S. When the encrusting machine 1 is used, an encrusted food product with a double structure may be manufactured by encrusting the solid object S only with the inner material F without using the outer skin material D.

Figure 6:
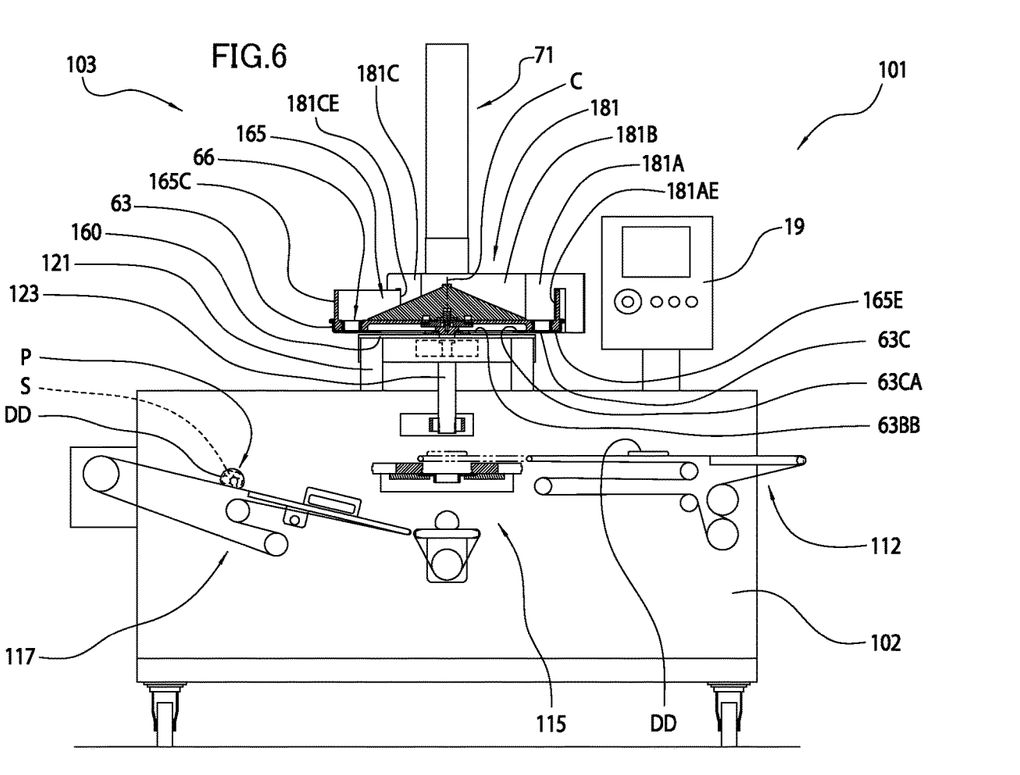
FIG. 6 is a schematically front view of a manufacturing device 101 for an encrusted food product with a solid object feeder 103 according to a second embodiment of the present invention.
Figure 7:
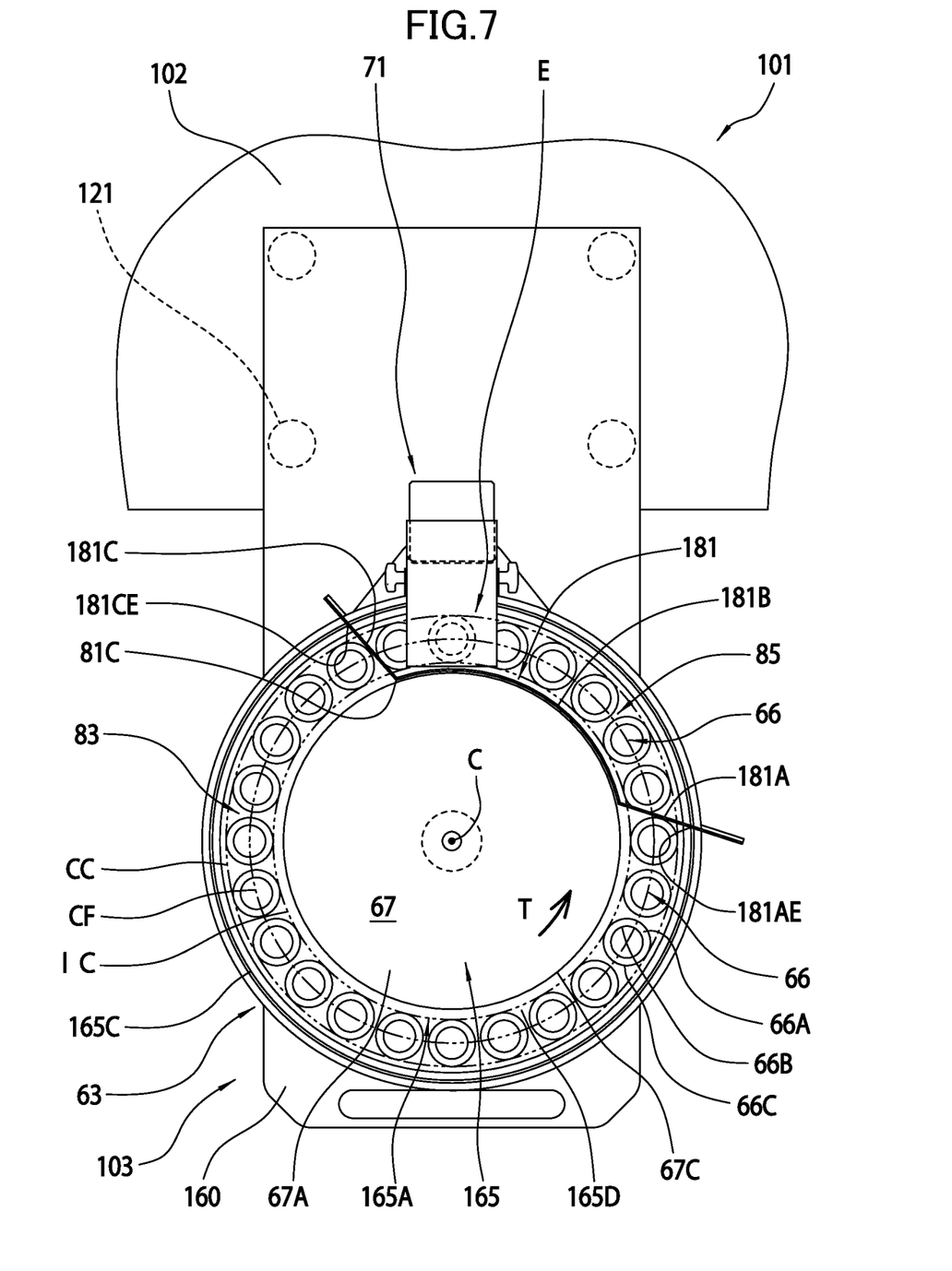
FIG. 7 is a schematically top (plan) view of the solid object feeder 103 according to the second embodiment of the present invention.

Referring to FIGS. 5-7, a manufacturing device 101 for an encrusted food product with a solid object feeder 103, which is a second embodiment of the present invention, will be explained. Components of the manufacturing device 103 according to the second embodiment, which are similar to those of the manufacturing device 1 according to the first embodiment, are indicated by the same characters as those of the manufacturing device 1, and their detailed explanations are omitted. Further, FIG. 5 can be also used as a partially cross-sectional view of a rotary disk 165 (explained later) and the lower hopper 63 along a line corresponding to the line V-V in FIG. 3 of the first embodiment. The manufacturing device 101 for the encrusted food product is configured to envelop a predetermined amount of the solid object S with a sheet-like outer skin material DD, and is referred to as an enveloping device 101. The enveloping device 101 includes a base frame 102, a solid object feeder 103 disposed on a top portion of the base frame 102 and can be raised and lowered, a slidable conveyor 112 disposed on a front side of the base frame 102 (near side in FIG. 6), a sealing device 115, a conveying device 117, and a control device 19 for controlling the driving action of each device. Since the enveloping device 101 has a known structure and is, for example, a device described in the Patent Publication 1, its detailed explanation is omitted.

As shown in FIG. 6, a solid object feeder 103, which is a second embodiment of the present invention, includes a base plate 160 disposed horizontally, and four lifting shafts 121 attached to a lower surface of the base plate 160, and is configured to be raised and lowered relative to the base frame 102 of the enveloping device 101. The base plate 160 includes an opening (not shown) located at the supplying location E, and a hollow tube member 123 which is concentric with the opening and is attached to the lower surface of the base plate 160. Thus, the tube member 123 is configured to come close to or go away from the sealing device 115 depending on the raising and lowering actions of the base plate 160. Further, the solid object feeder 103 includes a pushing device 71 disposed above the supplying location E.

The solid object feeder 103 further includes a rotary disk 165, an outer wall 165C, and a lower hopper 63, and unlike the first embodiment, does not include an upper hopper 62. The rotary disk 165 is parallel to the base plate 160 and disposed horizontally. The outer wall 165C extends upwardly from an upper surface of the peripheral portion 165A of the rotary disk 165 (concretely, a peripheral portion outside of the circumscribed circle CC of the storing holes 66), and is preferably formed integrally with the rotary disk 165.

The solid object feeder 103 further includes a guide member 181. As shown in FIG. 7, the guide member 181 partitions the space surrounded by the rotary disk 165 and the outer wall 165C into a storage portion 83 and a supply portion 85. The guide member 181 is a plate-like member, which includes, in plan view, a linear first guide portion 181A, an arc-curved second guide portion 181B, and a linear third guide portion 181C, and is detachably secured to the base plate 160. The first guide portion 181A has one end 181AE (beginning point of the guide member 181) located inside of the outer wall 165C. The second guide portion 181B is located concentric with and slightly outside of the maximum periphery 67C of the central projecting part 67. The third guide portion 181C has the other end 181OE (end point of the guide member 181) located inside of the outer wall 165C.

A distance between the maximum periphery 67C of the central projecting part 67 and the inscribed circle IC of the storing hole 66 is preferably shorter than a radius (half of a diameter) of the solid object S. This distance may be determined so that when the solid object S slips down or rolls from the slope side surface 67A of the central projecting part 67, the solid object S is easily dropped into the storing hole 66 without staying on the upper surface 165D of the rotary disk 165.

Like the first embodiment as shown in FIG. 5, the lower hopper 63 includes the top surface 63CA of the spacer 63C and the bottom surface 63BB of the lower hopper 63, which surfaces are the supporting members. In the support area 63A, the supporting member defines a step region 63E that continues from the first storing hole 661 (lowering start location), which is counted from the guide member 181 (first guide member 181A) toward the upstream side, to the storing hole 66 which is located at the supplying location E downstream side of the guide member 181 (first guide member 181A). The gap H2 between the bottom surface 63BB of the lower hopper 63 and a lower surface 165E of the rotary disk 165 in the step region 63E is larger than the gap H1 between the top surface 63CA of the spacer 63C in the other support area and the lower surface 165E of the rotary disk 165.

Next, referring to FIGS. 5-7, manufacturing process of the manufacturing device (enveloping device) 101 for the encrusted food product with the solid object feeder 103, which is the second embodiment of the present invention, will be explained. In the second embodiment, the outer skin material DD is a mixed dough including flour as main ingredient, the solid object S is a syrup-soaked whole chestnut, and the encrusted food product P is a double-structure food product in which a predetermined amount of the solid objects S are encrusted by the outer skin material DD.

A number of solid objects S are loaded into the storage portion 83 of the rotary disk 165 of the solid object feeder 103. The loaded solid objects S are stored in each of the storing holes 66 and the loaded solid objects S are accumulated on the upper surface of the rotary disk 165 in an overlapping way. When the manufacturing device 101 is activated, the solid object feeder 103 is also activated by the control device 19.

The solid object feeder 103 is lowered, and after the rotary disk 165 is rotated in the rotational direction T by 15 degrees, it is temporarily stopped. The solid object S is moved to the first storing hole 661 (lowering start location), which is counted from the guide member 181 (first guide portion 81A) toward the upstream side, to be lowered into the step region 63E and supported on the bottom surface 63BB of the lower hopper 63, so that the top or head of the solid object S is disposed lower than the upper surface 165D of the rotary disk 165. Further, the rotary disk 165 is intermittently rotated to allow the solid object S to pass a space below the guide member 181 and move to the supply portion 85. At this time, the other solid object S does not enter the storing hole 66 of storing the solid object S, and is not sandwiched between the first guide portion 181A and the storing hole 66 and thus, is not or is prevented from being broken.

In the supply portion 85, when the solid object S is stopped at the supplying location E by the intermittent rotation of the rotary disk 165, the solid object S is dropped inside of the tube member 123 and supplied to a central portion of the outer skin material DD disposed on an upper surface of a load member 41. Then, the encrusted food product P is manufactured by the manufacturing device 101.

The other solid objects S which are not moved to the supply portion 85 and accumulated near the first guide portion 181A are accumulated on the slope side surface 67A of the central projecting part 67 in a multi-overlapping way, guided by the first guide portion 181A and the second guide portion 181B as the rotary disk 165 is rotated, and moved from a side of the beginning point 181AE toward its downstream side. Then, the solid object S is released from the second guide portion 181B to move by sliding or rolling downwardly from the side surface 67A toward the peripheral portion 165A of the rotary disk 165. Further, the solid object S is stored in an empty storing hole 66.

As can be understood from the above explanations, each of the solid object feeders 3, 103 according to the embodiments of the present invention includes a supporting member of supporting the solid objects S stored in the storing holes 66 of the rotary disks 65, 165, and in the support area 63A for supporting the solid objects S, the supporting member defines the step region 63E for lowering a level (position) of supporting the solid object S relative to the rotary disk 65, 165.

Although the explanations of the solid object feeders 3, 103 which are the embodiments according to the present invention and the manufacturing device 1, 101 for the food product with such a solid object feeder have generally done, the present invention is not limited to the embodiments and various modifications are possible within the scope of the claims For example, in the support area 63A of supporting the solid object S in the above embodiments, the step region 63E of the supporting member continues from the location which corresponds to the first storing hole 661 counted from the guide member 81, 181 (first guide member 81A, 181A) toward the upstream side to the location which corresponds to the storing hole 66 at the supplying location E downstream of the guide members 81, 181, but the step region 63E may continue at least to a region where the solid object S has passed the space below the first guide member 81A, 181A.

The beginning point of the step region 63E, which is the lowering start location of the solid object S, is not limited to the location corresponding to the first storing hole 661 counted from the guide member 81, 181 toward the upstream side, and may be an appropriate location upstream of the guide member 181 depending on the degree of the tilt of the rotary disk 65 and the position of the guide member 81, 181. Further, in the above embodiments, the supporting member is defined by the top surface 65E, 165E of the spacer 63D and the bottom surface 63BB of the hopper 61 (lower hopper 63), but the supporting member may be formed of one member.

Further, the shape of the central projecting part 67 is not limited to a shape of a cone, and may be a shape of frustum of cone, a spherical cap, a spherical zone, a polygonal pyramid, or a frustum of polygonal pyramid, and the central projecting part 67 may have a side surface which is slop relative to the central axis C of the rotary disk. When the shape of the central projecting part 67 is polygonal, its side surface has bent edges to enhance a propulsive force of leading the solid objects S in the rotational direction T.

Further, in the above-stated embodiments, the storing holes are equally spaced on one circumference of a circle when viewed in a direction normal to the upper surface of the rotary disks 65, 165, but for example, the storing holes may be disposed on two circumferences of circles adjacent to each other, as described in the Patent Publication 3 filed by the applicant of the present application. Even in this case, due to the step region 63E which continues from the stopped first storing hole on each of the circumferences of the circles, which is counted from the guide member toward the upstream side, to a predetermined region, the solid object can be surely moved to the supplying location without damaging the solid object.

Further, in the solid object feeder 3, the central projecting part 67 disposed on the upper surface 65D of the rotary disk 65 may be omitted, and the solid objects S may be slid or rolled downwardly due to the tilt of the rotary disk 65.

The encrusting machine 1 and the enveloping device 101 for manufacturing the encrusted food product have been explained as the manufacturing device for the food product with the solid object food feeder, but each mechanism of these manufacturing devices may be combined. For example, a double-structure encrusted food product in which one chestnut is surrounded by a food material, such as a bean paste, may be manufactured by using the encrusting machine 1, and then, a triple-structure encrusted food product may be manufactured by placing the encrusted food product on an upper surface of a flat outer skin material DD disposed on the slidable conveyor 112, and enveloping the encrusted food product with the outer skin material DD by using the shutter device 43.

Further, in addition to manufacturing an encrusted food product, the manufacturing device for a food product may manufacture a food product in which a solid object S, which is supplied by the solid object feeder, is placed on an upper surface of a food dough or in a container.

1: 101: manufacturing device (encrusting machine, enveloping device)
2, 102: base frame
3, 103: solid object feeder
61: hopper
61A: opening
61B: outer wall
62: upper hopper
62B outer wall
63: lower hopper (supporting member)
63BA: outer wall
63BB: bottom surface
63A: support area
63B: lower hopper body (supporting member)
63C: spacer (supporting member)
63E: step region
65, 165: rotary disk
66: storing hole
67: central projecting part
67A: side surface
69: rotational axis
81, 181: guide member
81A, 181A: first guide portion
81AE, 181AE: one end, beginning point
81B, 181B: second guide portion
81C, 181C: third guide portion
810E, 1810E: other end, end point
83: storage portion
85: supplying portion
165C: outer wall (of rotary disk 165)
C: center (of rotary disk)
E: supplying location
P: (encrusted) food product
S: solid object

What is claimed:
1. A solid object feeder comprising:
a rotary disk including a plurality of storing holes for storing solid objects, the plurality of storing holes being equally spaced on a circumference of a circle in a peripheral portion of the rotary disk,
a supporting member disposed below the rotary disk to support the solid objects stored in the storing holes, and
a guide member disposed above the peripheral portion of the rotary disk, and
a driving device for rotating the rotary disk,
wherein the supporting member includes an opening at a supplying location so that the solid object can pass through the opening,
wherein the rotary disk is configured to move the solid object, which is stored in the storing hole, to the supplying location to supply the solid object downwardly,
wherein the supporting member includes a step region which continues from an upstream side to a downstream side relative to the guide member, and another region located upstream of the step region, and
wherein a second gap between the supporting member and a lower surface of the rotary disk in the step region is determined so that the solid object can move below the guide member from the upstream side to the downstream side relative to the guide member, and the second gap is larger than a first gap between the supporting member and the lower surface of the rotary disk in the other region located upstream of the step region.

2. The solid object feeder according to claim 1, wherein the first gap is determined so that the solid object protrudes from an upper surface of the rotary disk.

3. The solid object feeder according to claim 1, wherein the step region extends from a location corresponding to the first storing hole counted from the guide member toward the upstream side.

4. The solid object feeder according to claim 1, wherein the rotary disk is tilted so that the supplying location is disposed at a higher level.

5. The solid object feeder according to claim 1, further comprising a central projecting part including a slope peripheral surface which is slope downwardly from a center of the rotary disk toward a periphery of the central projecting part,
wherein the central projecting part is disposed on an upper surface of the rotary disk or integrally formed with the rotary disk.

6. The solid object feeder according to claim 5, wherein the central projecting part is disposed inside of an annular area in which the plurality of storing holes are disposed.

7. The solid object feeder according to claim 6, further comprising an outer wall which extends upwardly from a position above an upper surface of the rotary disk and is disposed above the peripheral portion of the rotary disk,
wherein the guide member is disposed between an inner side of the outer wall and the central projecting part to partition an inside of the outer wall into a storage portion of storing the solid objects and a supply portion including the supplying location.

8. The solid object feeder according to claim 6, further comprising an outer wall which extends upwardly from an upper surface of the rotary disk and is disposed in the peripheral portion of the rotary disk,
wherein the guide member is disposed between an inner side of the outer wall and the central projecting part to partition an inside of the outer wall into a storage portion of storing the solid objects and a supply portion including the supplying location.

* * * * *